Nov. 2, 1948.       R. J. NEBESAR       2,452,783
SHOCK-PROOF AERIAL DELIVERY CONTRIVANCE
Filed Oct. 13, 1945                     2 Sheets-Sheet 1

WITNESS:
Rob't P. Kitchel.

INVENTOR.
Robert J. Nebesar
BY Busser and Harding
ATTORNEYS.

Patented Nov. 2, 1948

2,452,783

UNITED STATES PATENT OFFICE 2,452,783

SHOCKPROOF AERIAL DELIVERY CONTRIVANCE

Robert J. Nebesar, Bristol, Va., assignor to Universal Moulded Products Corporation, Bristol, Va., a corporation of Delaware Application October 13, 1945, Serial No. 622,205

4 Claims. (Cl. 244—138)

The object of my invention is to provide a shock-proof aerial delivery contrivance which can be launched from a flying airplane without a parachute.

It is well known to deliver supplies of various kinds, such as food, to a desired destination inaccessible, or not conveniently accessible, by more usual transporting means, by carrying the supplies container above the point of delivery by means of an airplane, attaching a parachute to the container and launching the loaded parachute.

This supply-delivering expedient is open to certain serious objections. Where precision of the locus of delivery is necessary or highly desirable, it is difficult or impossible to insure it, since, unless the atmosphere is quite calm, or the direction and velocity of the wind very carefully calculated, the container is likely to land at a considerable distance from the desired point of delivery and even at some location which is nearly or quite inaccessible from the desired point of delivery. Also, under the most favorable atmospheric conditions, the container must be launched from a comparatively great height, in order that the parachute may have time to open and then sufficiently so slow down the speed of drop that, just before the moment of landing, the container will be dropping at a speed sufficiently slow to insure against serious damage to its contents.

The object of my invention is to provide a supplies delivery device that, almost regardless of wind direction and the level of launching, will be delivered at approximately a selected precise locus with insurance against damage to the supplies. These objects are secured by the aerial delivery device hereinafter described.

In the drawings, which show a preferred embodiment of the invention—

Figure 1:
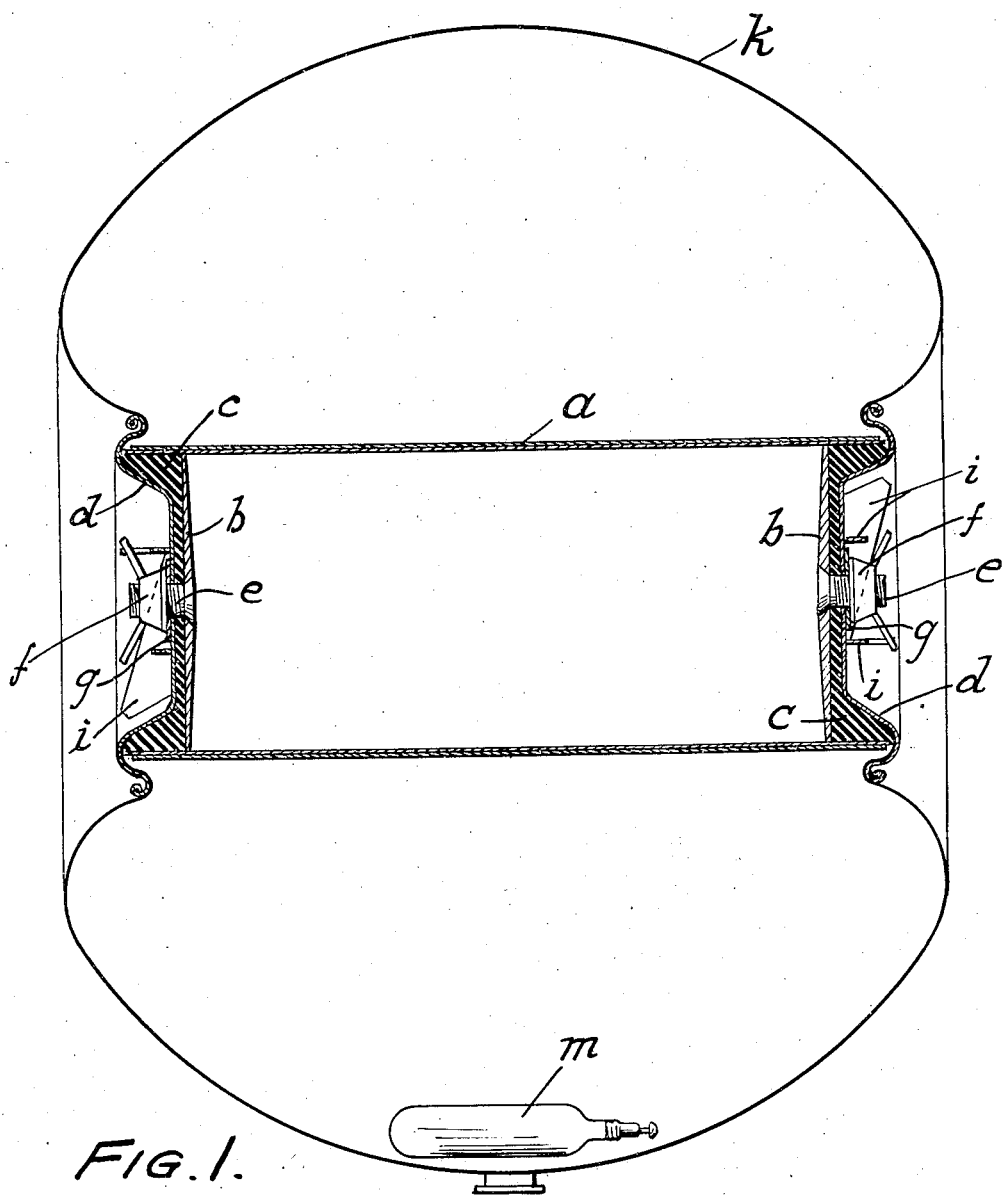
Fig. 1 is a sectional view of the contrivance, in the form it assumes during descent, looking in a direction normal to its axis.

The invention comprises a container for the supplies that has substantial resistance to damage from dropping or tumbling and an inflatable bag of flexible and elastic material so secured to the container that, when inflated, it will so cushion the fall of the container that no serious damage will be suffered by the container or its contents.

The container that I prefer to embody in said composite structure is one that I have more especially designed for holding rockets or ammunition, but which, being moisture-proof and to a limited but substantial degree shock-proof, is, I have found, well adapted for use as an element of said composite structure. The body $a$ of the container is of tubular form and is open at both ends but is adapted to be closed at each end as hereinafter described. The container may be of any suitable material, such as, for example, paper, wood, steel or magnesium alloy. Each closure comprises a backing plate $b$, a rubber packing $c$, a steel cap $d$, a bolt $e$ secured to or integral with the backing plate, and a wing nut $f$. When the closure is applied to the container, the latter extends beyond the backing plate $b$. The nut $f$ confines the packing $c$ within the cap $d$, the backing plate $b$ and the end of the tube $a$ extending beyond the backing plate.

The outer part of the steel cap $d$ is well rounded to absorb the drop on its head or corner and is provided with a crowned end extendng over and outside, and spaced from, the tube $a$, which protects the end of the tube against damage due to impact loads from dropping or tumbling. The cap $d$ is dished in at a fairly steep angle, preferably about 45°, so that the wing nut $f$ extends into, and is preferably wholly contained within, the recess thus formed. The dished-in part of the cap $d$ exerts the requisite pressure against the rubber packing $c$ when the nut $f$ is turned on the bolt $e$. The bolt $e$ is secured to the backing plate $b$ preferably by welding, but it may be made in one piece with the backing plate by drop forging.

The outer wall of the rubber packing $c$ conforms to the tube $a$ but fits loosely therein while the closure is being slipped into the tube and otherwise approximately conforms to the backing plate $b$ and to the shape of the cap $d$.

To fill the container, which may be assumed to have both ends open, an assembled end closure unit, comprising the plate $b$, rubber packing $c$, cap $d$, bolt $e$, nut $f$ and washer $g$, is inserted loosely into the end of the tube $a$. The wing nut is then tightened on the bolt until the rubber grips the inner wall of the tube. The supplies to be carried by the container are then inserted into the tube $a$ through the other (still open) end. The latter end is then closed by another similar closure unit.

The container, so far as described, is disclosed and claimed in an application filed by me February 10, 1945, Serial No. 577,206, now abandoned, and is not herein claimed except as an element of the complete combination constituting the invention described and claimed herein.

Figure 2:
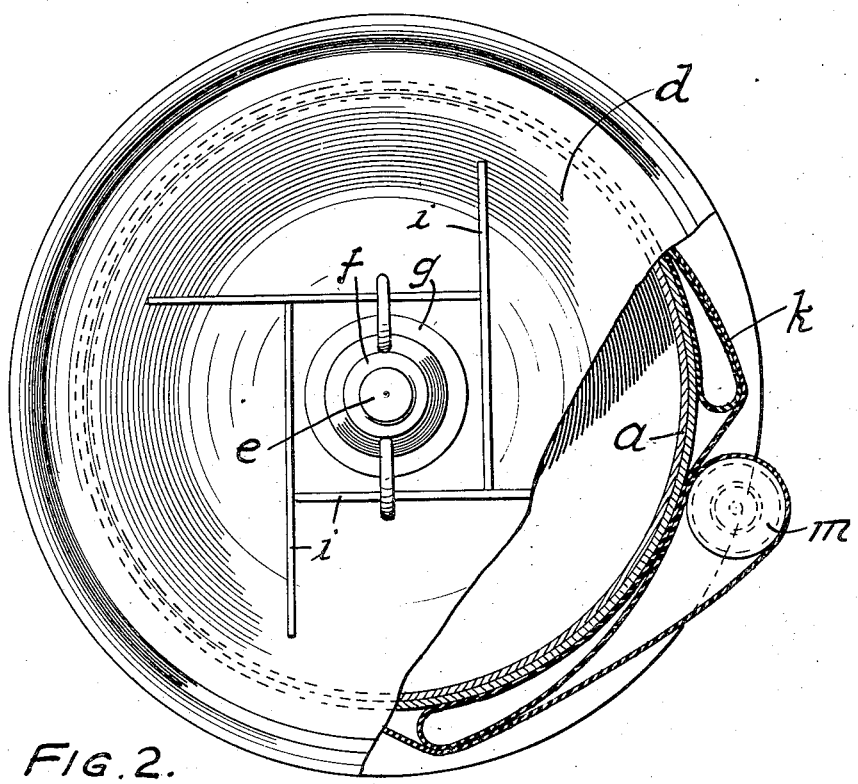
Fig. 2 is an enlarged end view, partly in section.

In order to better adapt this described container, or any container of different construction, to operate, as an element of the combination, with more certainty, I have applied to the cap $d$ wings $i$, arranged preferably as best shown in Fig. 2, the purpose of which will be hereinafter described.

Figure 3:
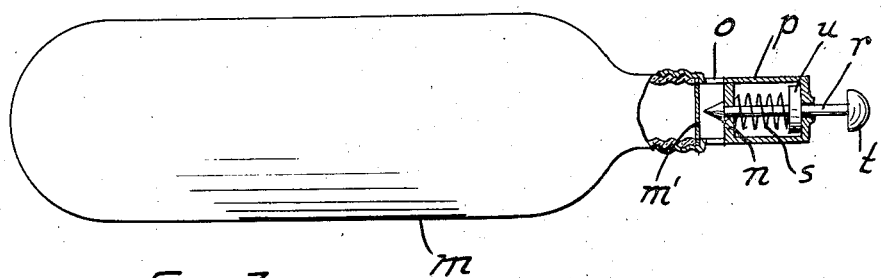
Fig. 3 is a detail view, partly in section, of the holder for expansible fluid.

Secured between the cap $d$ and the rubber packing $c$ is an inflatable bag $k$ of flexible and elastic material, preferably of rubber, which is normally folded around the container as shown, in part, in Fig. 2. Carried within, and completely enclosed by, the bag $k$, is a holder $m$, which contains either a highly compressed gas or a liquid which, when released, will expand into a gas; in other words, any expansible fluid. In Figs. 1 and 3 this holder is shown as of bottle shape, the neck of which is sealed by a diaphragm or other perforable closure $m'$. Extending from the neck of the holder is a housing $p$, preferably tubular, having openings $o$ and beyond these openings a partition $n$, through the center of which is slidable a pin $r$ having secured to it a disc $u$. The pin has a pointed end which is normally held against the partition $n$ by a spring $s$ abutting against disc $u$. The pin $r$ extends beyond the end wall of the housing $p$ and is provided at its outer end with a head $t$.

Before launching the device, the pin is moved inward, against the pressure of the spring, to effect perforation of the closure $m$, which movement may be effected by force applied at a point on the bag which overlies the head $t$ of the pin $r$, which force may be either pressure or a hammer blow. Upon perforation of the closure $m$ the expansible fluid escapes through the perforation into the housing $p$ and out of the openings $o$, thereby inflating the bag, as shown in Fig. 1. The container is then immediately launched and drops down toward the locus of delivery. The falling speed is comparable to that of a partially deflated balloon, and will of course be a very much lower speed than if the rigid container $a$ were not carried by the inflated bag.

At whatever speed the contrivance strikes the ground, the blow on the container holding the supplies will be effectively cushioned.

During the fall of the device the wings $i$ tend to impart to the container a rotary motion that tends to maintain the axis of the container in a direction more or less approximating the horizontal, so that the device is not likely to land endwise, although if it should so land, the blow on the rigid container will still be cushioned to a lesser but adequate degree.

It will be observed from the drawings that when the inflatable bag is fully expanded it assumes an approximately spherical shape. This gives the best protection, not only from the viewpoint of all-around shock absorption and improved resistance in the air, but also in that it allows after landing rolling on the ground to thereby absorb additional kinetic energy.

While the rigid container $a$ is desirably resistant to stresses and shocks due to dropping or tumbling in ordinary rough handling, avoidance of rupture could not be assured if it were dropped to the ground from any considerable height. Indeed, it is not essential to an embodiment of my invention that the container should have the high shock-proof characteristic described, since the inflated bag alone may usually be depended upon to cushion the fall sufficiently to prevent serious damage to the container or the supplies carried thereby. However, a supplies container possessing material resistance against shock is desirable, and therefore the use of the specific supplies container described is preferred, since thereby a double insurance against damage to the supplies is attained. Nor need the shell or body of the supplies container be necessarily of rigid material if the supplies would not be harmed by some deformation of the shell or body. But a shell or body of rigid material is highly desirable to insure against displacements of any supplies that would otherwise be likely to suffer injury.

A container embodying my invention is less responsive to wind currents than a parachute and can be launched from any convenient height; but it is obvious that it is desirable to launch it from an altitude much lower than is practicable when the container is carried by a parachute, since thereby the landing of the device at the desired point of delivery is insured with more nearly absolute certainty.

What I claim and desire to protect by Letters Patent is:

1. A shock-proof aerial-delivery contrivance that may be launched from an airplane and which comprises a supplies container and a collapsible and inflatable bag of flexible and elastic material; said container comprising a tubular body, an end closure or closures therefor, said closure comprising a backing plate and an elastic packing adapted to be freely insertable into the end of the container, said packing having a relatively thin central portion and increasing in thickness toward its periphery so as to thereby provide a packing having a substantially frusto-conical outer face area; a thin dished-in cap conforming to and engaging the outer face of the packing and having a marginal extension curved outward over and spaced from the end edge of the tubular container and thence backward outside of and spaced from the end portion of the tubular container when the backing plate, packing and cap are inserted therein as specified, a central bolt in rigid relation with the backing plate and extending through the relatively thin central portion of the packing and through the center of the cap, and a nut on the bolt positioned in the recess formed by the dished-in cap and adapted to be tightened to expand the packing radially and axially to thereby effectually seal the closure; said bag being secured to said container between said packing and cap and together with said closure or closures completely sealing the bag from the atmosphere; and means to inflate the bag.

2. A shock-proof aerial-delivery contrivance that may be launched from an airplane and which comprises a tubular supplies container and end closures therefor, an inflatable bag of flexible and elastic material secured to said end closures and enclosing the container body but otherwise unconfined and free upon inflation to expand to the limit of its expansibility so as to expand not only radially of the container axis but beyond the ends of the container, means, operable preparatory to launching, to effect inflation of the bag so that upon striking the ground the inflated bag will contact therewith and effectively cushion the supplies.

3. The shock-proof aerial-delivery contrivance that may be launched from an airplane and which comprises a tubular supplies container and end closures therefor, an inflatable bag of flexible and elastic material secured to said end closures and enclosing the container body but otherwise unconfined and free upon inflation to expand to the limit of its expansibility, means, operable preparatory to launching, to effect inflation of the bag so that upon striking the ground the inflated bag will contact therewith and effectively cushion the supplies and wings, outside the bag, secured to the outside faces of the end closures and extending beyond them tending, during the descent of the container and inflated bag, to rotate the contrivance on the axis of the container and maintain the container in a direction approximating the horizontal to thereby reduce the likelihood of the contrivance landing edgewise.

4. A shock-proof aerial-delivery contrivance as defined in claim 2 in which the wall of the inflatable bag at full expansion assumes an approximately spherical shape to thereby provide maximum shock absorption and improved resistance in the air and allow rolling on the ground after landing.

ROBERT J. NEBESAR.

REFERENCES CITED

The following references are of record in the file of this patent:

UNITED STATES PATENTS

| Number | Name | Date |
|---|---|---|
| 1,457,496 | Butler | June 5, 1923 |
| 2,202,415 | Christopher | May 28, 1940 |
| 2,314,914 | Wilson | Mar. 30, 1943 |
| 2,324,146 | Frazer | July 13, 1943 |

FOREIGN PATENTS

| Number | Country | Date |
|---|---|---|
| 545,645 | Germany | Mar. 4, 1932 |
| 64,125 | Switzerland | Feb. 17, 1913 |
| 720,793 | France | Dec. 12, 1931 |